(12) United States Patent
Yoshikawa

(10) Patent No.: US 8,010,672 B2
(45) Date of Patent: Aug. 30, 2011

(54) METHODS AND SYSTEMS FOR CONTROLLING UTILIZATION OF RESOURCES OF CONTENTION

(75) Inventor: Cary Y. Yoshikawa, Aurora, IL (US)

(73) Assignee: Alcatel Lucent, Paris (FR)

(*) Notice: Subject to any disclaimer, the term of this patent is extended or adjusted under 35 U.S.C. 154(b) by 1621 days.

(21) Appl. No.: 11/193,522

(22) Filed: Jul. 29, 2005

(65) Prior Publication Data
US 2007/0058662 A1 Mar. 15, 2007

(51) Int. Cl.
*G06F 15/173* (2006.01)
*H04W 72/00* (2009.01)
(52) U.S. Cl. .................... 709/226; 455/453
(58) Field of Classification Search .......... 709/226; 370/230; 455/453
See application file for complete search history.

(56) References Cited

U.S. PATENT DOCUMENTS

| | | | |
|---|---|---|---|
| 6,405,045 B1 * | 6/2002 | Choi et al. | 455/453 |
| 6,434,559 B1 * | 8/2002 | Lundberg et al. | 1/1 |
| 6,535,736 B1 | 3/2003 | Balogh et al. | |
| 6,785,546 B1 * | 8/2004 | Djuric | 455/445 |
| 7,173,904 B1 * | 2/2007 | Kim | 370/230 |
| 7,187,651 B1 * | 3/2007 | Volftsun et al. | 370/235 |
| 2002/0118661 A1 | 8/2002 | Voce | |
| 2004/0165529 A1 * | 8/2004 | Lee | 370/230 |

FOREIGN PATENT DOCUMENTS
CN 1529471 (A) 9/2004

OTHER PUBLICATIONS

PCT International Search Report and Written Opinion PCT/US2006/028632.
Written Opinion of the International Search Authority, PCT/US2006/028632, Jul. 21, 2006, Lucent Technologies Inc.
International Preliminary Report on Patentability, Jan. 29, 2008.
European Search Report, application No. 06 788 282.9-2416, Nov. 20, 2009.
Chinese Office Action, Chinese Patent Application No. 2006800234277, May 27, 2010.
Russian Office Action, Russian Patent Application No. 2008 107 256, Jul. 2, 2010.
Chinese Office Action, Chinese Patent Application No. 200680023427.7, Jun. 16, 2011.

* cited by examiner

*Primary Examiner* — J Bret Dennison
*Assistant Examiner* — Steven C Nguyen
(74) *Attorney, Agent, or Firm* — Fay Sharpe LLP

(57) ABSTRACT

Methods and systems for controlling utilization of resources(s) of contention by a plurality of devices of a single or multiple priority classes. A utilization scaling factor is determined for each class for the resource(s) and compared with a threshold value. An apersistence property pattern is then created for each class that includes apersistence property entries corresponding to apersistence update cycles of an apersistence pattern window. Where the scaling factor is in a first range corresponding to low resource loading, the class pattern includes unimpeded entries allowing the devices in a class to attempt to utilize the resource. Otherwise, the class pattern is created with at least one blocking entry that prevents all devices in a class from attempting utilization of the resource during the corresponding apersistence update cycle. An apersistence property pattern entry is then provided from the pattern to the devices in each apersistence update cycle of the apersistence pattern window.

30 Claims, 9 Drawing Sheets

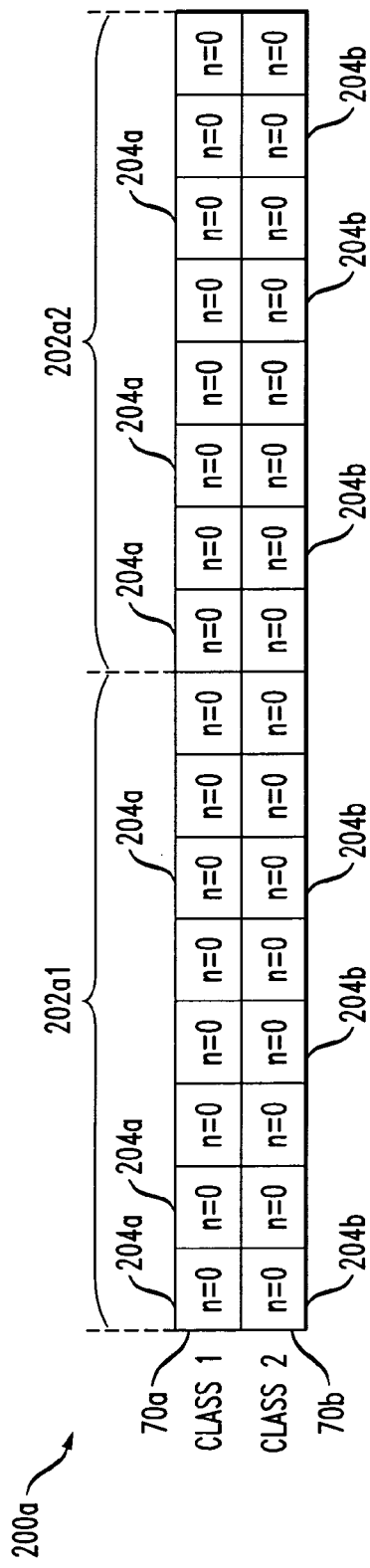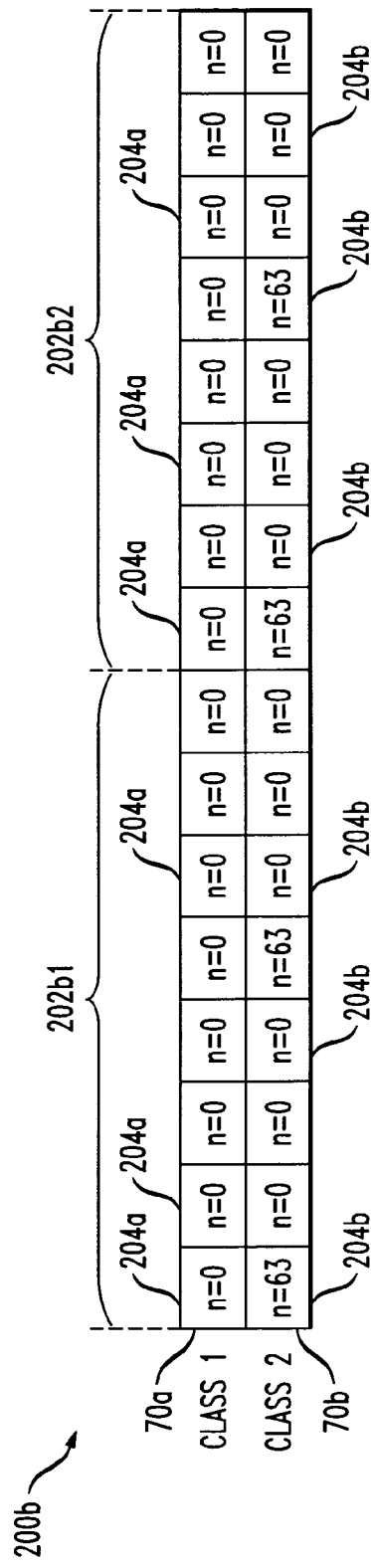

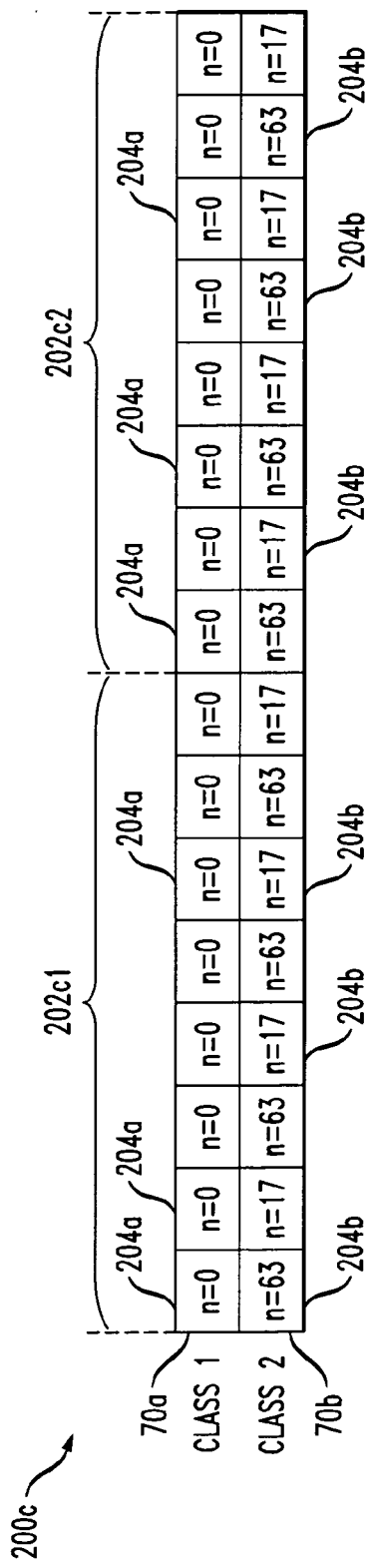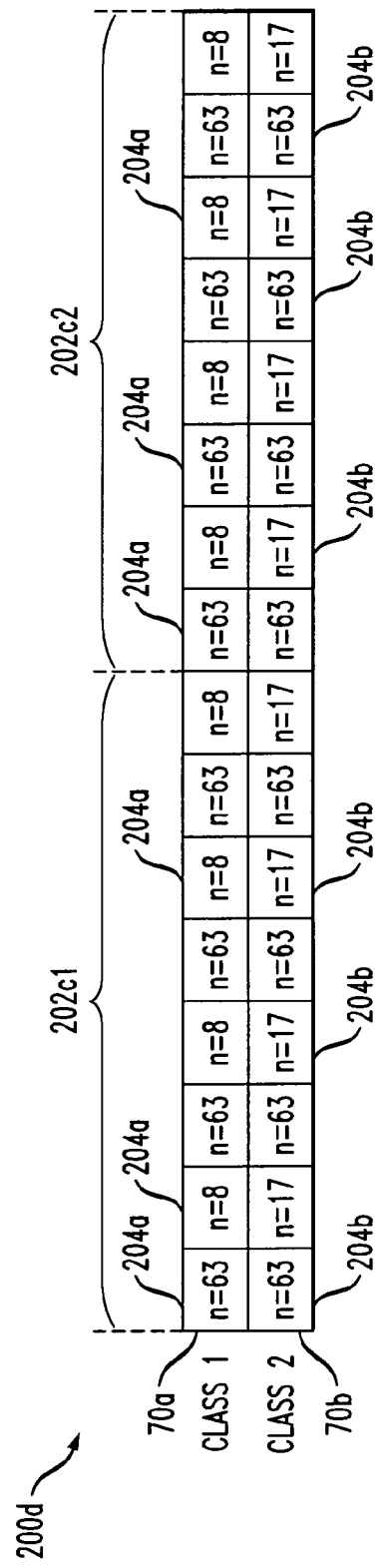

METHODS AND SYSTEMS FOR CONTROLLING UTILIZATION OF RESOURCES OF CONTENTION

FIELD OF THE INVENTION

The invention relates to communications networks in general, and more particularly to methods and systems for facilitating utilization of resources of contention.

BACKGROUND OF THE INVENTION

In communications systems, such as wireless, wireline, LAN, WAN, WIMAX, Blue Tooth wireless mobile communications systems, etc., many devices need to utilize various resources, such as communications network elements, base stations, networks, communications media, etc., where a plurality of devices contend or compete for a given resource or pool of resources. In addition, modern Evolution Data Only (EVDO) EVDO Rev. A and other communications systems may provide for multiple levels of device priority (priority classes), where access to shared resources is provided in prioritized fashion, with devices of a higher priority class receiving preferential utilization compared with lower priority devices. In systems having a single or multiple priority levels, resource contention can occur when multiple devices attempt to simultaneously access a resource such that the input handling capacity of the resource is exceeded (access attempt collision failure), or when the resource is operating at maximum capacity and is unable to service any additional information from one or more devices (utilization attempt failure). For instance, to initiate a call in an EVDO Rev. A wireless network, mobile communications devices, such as cell phones, PDAs, portable computers, etc., compete for access to a local base station serving a given area or location to communicate with the base station over an access channel. In this case, the base station periodically sends a broadcast message to all devices in the area, which identifies the access channel to be used for setting up a call. Contention arises when two or more mobile units simultaneously attempt to access the base station on the access channel, leading to a collision of the call initiation messages. Resource utilization contention occurs when contention for a shared resource with limited utilization or loading capabilities causes some attempts for utilization to fail (e.g., dropped data packets).

In many communications systems, the accessing devices include functionality to allow the device to retry a failed access attempt, known as apersistence. In conventional Multiple Access Collision Detection (MACD) bus arbitration systems, devices connected to a common bus resource will initiate data transfer in an asynchronous fashion and will listen to the bus to detect if a collision occurred. If so, each device involved in the collision will wait for a random time and then retry the transfer. In this type of system, the device apersistence is therefore random in nature, with the individual devices generating the random time value internally. In other systems with shared resources, the devices perform an apersistence test using apersistence property information received from the resource of contention. For instance, the devices in an EVDO environment will be synchronized with the base station to selectively attempt access at discrete times, where the devices internally perform an apersistence test using an apersistence property value broadcast by the base station. The devices derive an apersistence number from the apersistence property value received from the base station, and compare the apersistence number to a randomly generated value in each access cycle, whereby the decision on whether to attempt a utilization by the device is determined by information received from the resource of contention. In these systems, the resource typically adjusts the value of the apersistence property so as to reduce the likelihood of a given device passing the apersistence test when the current resource load is high. However, this leads to an increasing accumulation of devices failing the apersistence test, which carry over into the next access cycle, where the apersistence test is then subjected to this carryover as well as any incoming devices attempting to access the resource of contention, eventually leading to sub-optimal resource utilization. Accordingly, there is a need for improved methods and systems for controlling utilization of shared resources by which the accumulation of devices failing an apersistence test can be alleviated in a communications system.

SUMMARY OF THE INVENTION

A summary of one or more aspects of the invention is now presented to facilitate a basic understanding thereof, wherein this summary is not an extensive overview of the invention, and is intended neither to identify certain elements of the invention, nor to delineate-the scope of the invention. Rather, the primary purpose of the summary is to present some concepts of the invention in a simplified form prior to the more detailed description that is presented hereinafter.

The invention relates to systems and methods for apersistence value adjustment for controlling access or utilization (hereinafter collectively referred to as utilization, wherein "utilization" is deemed to include any usage of a resource including but not limited to new accesses or access attempts, as well as continued use of a resource that has previously been accessed, etc.) of shared resources, in which the resource or an apersistence control system associated therewith provides apersistence property values in the form of multiple value patterns to the devices. The invention may be employed in conjunction with resources and devices of any type, regardless of the particular form of apersistence test performed by the devices, where the device performs the test according to a value received from the resource or an apersistence control system operatively associated with the resource to determine whether the device will attempt to use the resource. The resource loading is characterized using a scaling factor computed according to the current resource utilization loading, and different levels of apersistence throttling are employed according to whether the current utilization (also referred to hereinafter as actual utilization, measured utilization, or predicted utilization shall mean the total attempted utilization rate by all devices in a class before throttling is implemented) is high or low, where the apersistence property values are provided as entries in multi-entry patterns. For high loading situations, the pattern entries include blocking and non-blocking values to effectively throttle the utilization, thereby reducing the buildup of device carryover and attaining improved overall system throughput.

A resource utilization scaling factor is determined, such as by dividing desired throughput by current measured or predicted incoming throughput or by dividing measured or predicted incoming throughput by desired throughput, or calculating any other value based at least in part on the current utilization that varies as the amount of loading on the resource changes. The scaling factor is compared to one or more threshold values to ascertain whether the scaling factor is in a range in which no throttling is needed or is in another (higher utilization) range in which resource throttling is to be employed. Depending on the range in which the scaling factor falls, different apersistence pattern values are provided to the devices trying to utilize the resource under contention to implement no throttling, moderate throttling, aggressive throttling, etc.

For scaling factors in a first range indicating low loading situations (e.g., scaling factors above a first threshold in one example), unimpeded pattern entry values are provided to allow all devices to pass the apersistence test. For a second range of scaling factors corresponding to higher current utilization loading than in the first range, the apersistence patterns are constructed to include one or more blocking entry values that prevent any device from passing the apersistence test in a corresponding access cycle, as well as one or more non-blocking entries corresponding to other access cycles of the pattern window. In specific embodiments, the second range can be further subdivided into first and second portions with the second portion corresponding to higher current utilization than the first portion, with moderate throttling being employed for certain utilization scaling factors in the first portion (e.g., between the first threshold and a second lower threshold value), and more aggressive throttling for scaling factor values in the second portion of the second range (e.g., scaling factor below the second threshold). In this case, the pattern is constructed to include blocking and non-blocking entries for utilization scaling factors in the third range, where the non-blocking entries have values determined according to the scaling factor.

In one possible embodiment the scaling factor may be computed as current predicted or measured incoming utilization divided by desired utilization, where a value of 1.0 indicates current expected or measured loading is equal to the desired level, with higher scaling factors indicating higher incoming utilization (higher loading). In an equivalent embodiment using utilization scaling factors representing the desired resource loading divided by the current predicted or measured incoming load, a unity scaling factor indicates current expected or measured loading is equal to the desired level, and lower scaling factors indicate higher loading situations. In this case, the first range includes scaling factors greater than a first threshold value, and unimpeded entries are provided in the apersistence pattern. Where the utilization scaling factor is below the first threshold, such as less than or equal to 1.0 in one implementation, the apersistence patterns are constructed to include one or more blocking values that prevent any device from passing the apersistence test in a corresponding apersistence update cycle and access cycles thereof.

In one implementation illustrated and described below, for scaling factors equal to desired utilization divided by measured or predicted current utilization in a first portion of a second range (e.g., between the first threshold 1.0 and a second threshold value 0.5, where the second threshold indicates higher resource loading than the first threshold), the blocking entries are dispersed between unimpeded entries (e.g., entries allowing all devices to pass the apersistence test in a corresponding apersistence update cycle and access cycles thereof), with the ratio of unimpeded to total entries in the pattern being substantially proportional to the ratio of desired utilization to measured or predicted current utilization to provide a moderate amount of throttling. For even lower utilization scaling factors below the second threshold value (e.g., in a second portion of the second range with higher resource loading than the first portion), the pattern includes blocking and non-blocking entries, where the non-blocking entries have apersistence values determined according to the utilization scaling factor, with a ratio of the number of non-blocking entries to the total number of entries in the pattern being substantially proportional to the second threshold value. This technique may be advantageously employed in order to clear out some or all carryover devices that have previously failed the apersistence test to provide improved resource utilization for single or multiple class implementations, where the invention may be employed in EVDO or other wireless communications systems as well as in any system in which multiple devices compete for use of resources under contention.

One aspect of the invention provides a method of controlling resource utilization by a plurality of devices. The novel method includes determining a utilization scaling factor for the resource based at least in part on a desired utilization and a current utilization, where the value of the utilization scaling factor varies as the current utilization changes. The scaling factor may be based on throughput for a data transfer medium such as a wireless system base station, or may be based on any other measure of the loading (utilization) of the resource. In one example, a desired utilization is determined (e.g., throughput in busy hour call attempts or BHCA) and a current loading or other utilization amount is measured or otherwise determined (e.g., incoming throughput traffic BHCA, measured, predicted, etc.) for a preceding apersistence window period, with the scaling factor for the current window being calculated as desired utilization divided by the measured current utilization. Where the system supports multiple priority classes for devices of a plurality of different priority classes, a class utilization scaling factor may be determined for each priority class. The method further comprises creating an apersistence property pattern having entries corresponding to a plurality of apersistence update cycles of a current apersistence pattern window. The entries are then provided to the devices in each update cycle of the current apersistence pattern window, such as in periodic broadcast messages from a base station to mobile communications devices in an EVDO implementation.

The apersistence update cycle is constructed to include one or more access cycles in which devices desiring resource utilization perform an apersistence test, with the pattern having a number of entries corresponding to individual apersistence update cycles in a multiple update cycle pattern window. Where devices of different priority classes are able to utilize the resource, a class apersistence property pattern is created for each priority class in each pattern window. In such multiple class embodiments, different window lengths may be used for different priority classes, and the start of the class windows may be staggered. The pattern (or class pattern) is created to include unimpeded entries if the corresponding utilization scaling factor is in a first range corresponding to low resource loading. In one example with the scaling factor being calculated as a ratio of desired loading divided by actual (e.g., measured or predicted) loading, the first range may include scaling factor values greater than a first threshold value (e.g., using a threshold of 1.0 where the current utilization is less than the desired amount), so as to allow all devices to pass the apersistence test for low loading situations.

One or more blocking entries are inserted in the pattern for higher loading situations (e.g., where the utilization scaling factor is in a second range of values less than or equal to the first threshold, using the above example where the scaling factor is calculated as a ratio of desired loading divided by current loading), in which the blocking entries may be maximally dispersed between non-blocking entries in the pattern. In the implementation illustrated below, if the utilization scaling factor is less than or equal to the first threshold value but greater than a second threshold value (e.g., 0.5, where the scaling factor is in a first portion of the second range representing higher loading than the first range, but less loading than the second portion of the second range), the pattern is constructed to include at least one blocking entry and at least one unimpeded entry with a ratio of unimpeded to total entries being substantially proportional to the desired utilization divided by current utilization (equal to the utilization scaling factor in this example) to provide a moderate amount of system throttling. In this embodiment, where the scaling factor is less than or equal to the second threshold (even higher loading in a second portion of the second range), the pattern for the given class includes blocking and non-blocking entries where the non-blocking pattern entries have a value determined according to the utilization scaling factor to provide more aggressive throttling, and where the ratio of non-blocking to total entries is substantially proportional to the ratio of desired utilization to current utilization at the second threshold, which is numerically equal to the second threshold in the example where the utilization scaling factor is defined to be the ratio of desired utilization to current utilization.

Another aspect of the invention relates to an apersistence control system for controlling utilization of a resource by a plurality of devices, which may be integrated in the resource or otherwise operationally associated therewith. The system comprises means for determining a utilization scaling factor for a resource based at least in part on current utilization, where the value of the utilization scaling factor varies as the current utilization changes (e.g., such as by determining a desired utilization and a current utilization for the resource, and calculating an average utilization scaling factor as the desired utilization divided by the current utilization as shown in the examples below).

The system also comprises means for creating an apersistence property pattern comprising a plurality of apersistence property entries corresponding to apersistence update cycles of a current apersistence pattern window. The pattern is created with unimpeded entries if the utilization scaling factor is in a first range corresponding to low resource loading situations (e.g., where the above exemplary scaling factor is greater than a first threshold value), and otherwise includes one or more blocking entries (e.g., for scaling factors in a second range corresponding to higher loading). The system further comprises means for providing an apersistence property pattern entry from the pattern to the devices in each apersistence update cycle of the current apersistence pattern window.

In one straightforward implementation where the utilization scaling factor is defined to be the ratio of desired utilization to current utilization, the pattern includes at least one blocking entry and at least one unimpeded entry with a ratio of unimpeded to total entries being substantially proportional to the utilization scaling factor if the utilization scaling factor is less than or equal to the first threshold and greater than a second threshold value for moderate throttling (e.g., the scaling factor is in a first portion of the second range). If the scaling factor is less than or equal to the second threshold (e.g., in a second portion of the second range), the pattern is constructed with blocking and non-blocking entries, where the non-blocking entries have a value determined according to the utilization scaling factor, and where a ratio of the number of non-blocking to total entries in the pattern is determined according to the second threshold value.

Not limited to the specific example for the utilization scaling factor being equal to the ratio of desired to current utilizations, multi-class prioritized systems are possible, in which the means for determining the utilization scaling factor determines a class utilization scaling factor for each priority class, the means for creating an apersistence property pattern creates a class apersistence property pattern for each priority class, and the means for providing an apersistence property pattern entry provides apersistence property pattern entries from the class apersistence property patterns to the devices in each apersistence update cycle of the current apersistence pattern window.

Yet another aspect of the invention provides a wireless communications system base station resource, comprising means for providing communications services to a plurality of mobile communications units, and an apersistence control system for controlling utilization of the base station by the mobile communications units, which is operatively coupled with the means for providing communications services and may be integrated in the base station. The apersistence control system comprises means for determining a utilization scaling factor for the base station resource as well as means for creating an apersistence property pattern comprising a plurality of apersistence property entries corresponding to apersistence update cycles of a current apersistence pattern window. The pattern includes unimpeded entries if the throughput scaling factor is in a first range indicating low resource utilization, and otherwise includes at least one blocking entry for higher loading. The apersistence control system also includes means for providing an apersistence property pattern entry from the apersistence property pattern to the mobile communications units in each apersistence update cycle of the current apersistence pattern window.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which:

FIGS. 4A-4D are simplified schematic diagrams illustrating several exemplary apersistence property patterns with corresponding entries in accordance with the invention;

DETAILED DESCRIPTION OF THE INVENTION

Figure 1:
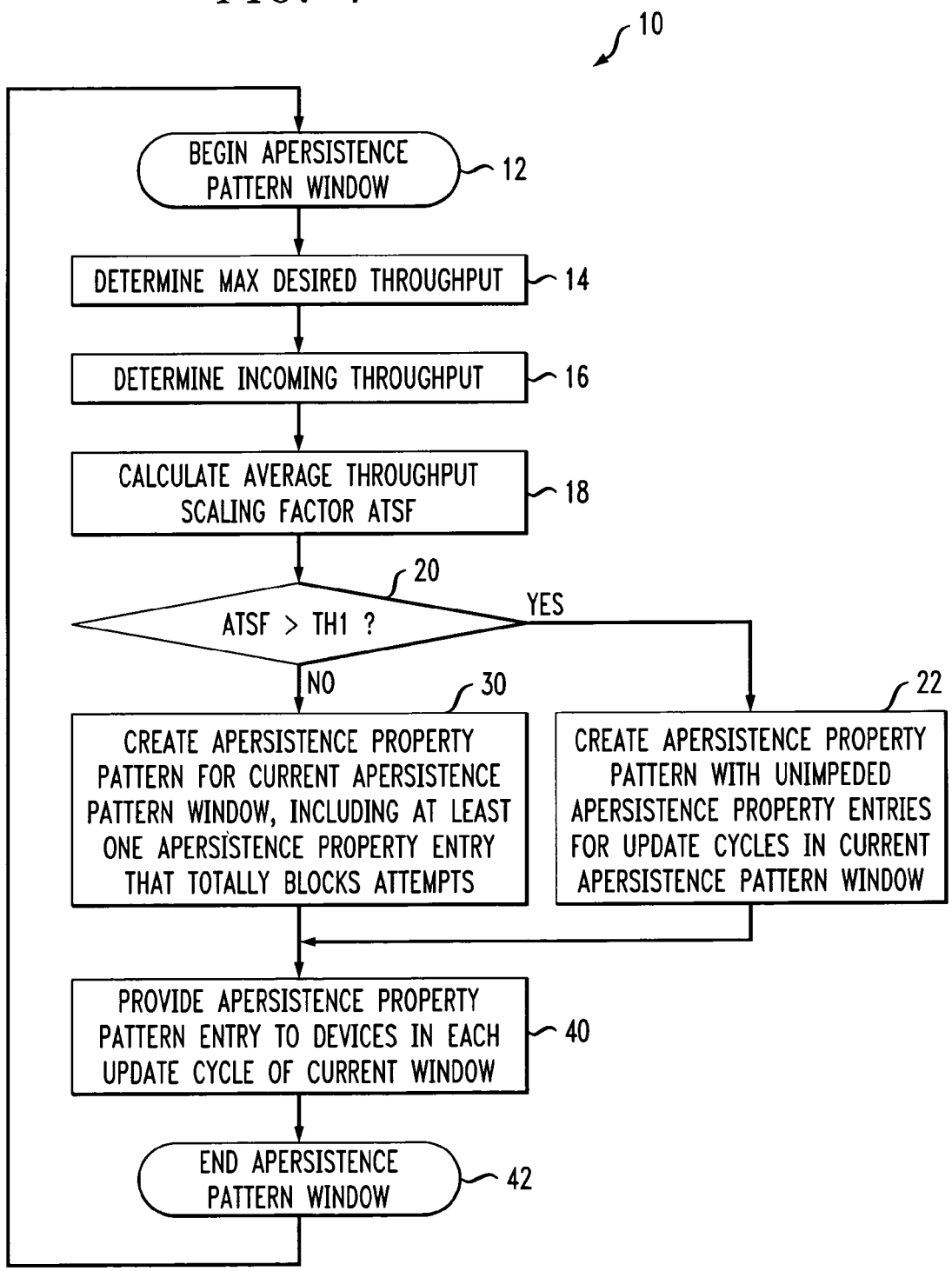
FIG. 1 is a flow diagram illustrating an exemplary method for controlling utilization of a resource of contention by a plurality of devices in accordance with one or more aspects of the present invention.

Referring initially to FIG. 1, a method 10 is illustrated for controlling utilization of a resource by a plurality of devices in accordance with one or more aspects of the invention. The method 10 generally provides for determining a utilization scaling factor for the resource at 14-18 and creation of an apersistence property pattern at 22 or 30 depending on the value of the utilization scaling factor, after which an apersistence property value is provided from the pattern to the devices at 40 in each update cycle of an apersistence pattern window, and the process 10 is then repeated for the next window. Although the method 10 and other methods of the invention are illustrated and described hereinafter as a series of acts or events, it will be appreciated that the various methods of the invention are not limited by the illustrated ordering of such acts or events. In this regard, some acts or events may occur in different order and/or concurrently with other acts or events apart from those illustrated and described herein in accordance with the invention. It is further noted that not all illustrated steps may be required to implement a process or method in accordance with the present invention.

The methods of the invention, moreover, may be implemented in association with the illustrated communication systems, messages, and user equipment or terminals, as well as other apparatus not illustrated or described, wherein all such alternatives are contemplated as falling within the scope of the present invention and the appended claims. For example, the methods of the invention may be implemented in the exemplary apersistence control system 60 in FIG. 2 below for controlling utilization by mobile communications devices 80 of a base station resource 50, or may alternatively be implemented in association with other systems in which multiple devices are attempting to utilize a shared resource or pool of resources by performing an apersistence test using apersistence properties provided by the resource or a control system associated therewith.

The method 10 is illustrated in FIG. 1 for a single apersistence pattern window that includes a plurality of apersistence update cycles with an apersistence property value being provided from a pattern of values to the accessing devices in each update. Within each update cycle, the devices may attempt to utilize the resource one or more times, such as at one or more access cycles in the examples illustrated below. However, the concepts of the invention are applicable to any system, whether the devices attempt accesses synchronously or asynchronously, and whether the device attempts occur once per apersistence update or multiple times in a given apersistence update cycle. In this regard, the invention is hereinafter described in the context of a wireless EVDO Rev. A communications system with wireless communications devices being synchronized to run individual apersistence tests once every access channel cycle (e.g., approximately once every 0.106 seconds in the illustrated example), with the resource (e.g., a base station in the EVDO system) sending broadcast messages to the devices including an apersistence property value (e.g., or a plurality of apersistence property values for a corresponding plurality of priority classes supported by the system) every eight access cycles (e.g., one apersistence update cycle=8 access channel cycles), and with eight update cycles per pattern window. However, the invention is not limited to the illustrated number of access or update cycles, and the number of update cycles in a pattern window may be dynamically changed within each class.

Furthermore, where different priority classes are supported, individual devices employ apersistence property values generated for the appropriate class, where the control systems and methods of the invention provide for creation of class patterns including values applicable to a given priority class, where a class apersistence property pattern may be created for each priority class in each pattern window. In such multiple class implementations, the class windows may be staggered and need not be of the same length, wherein the pattern window length may also be changed dynamically for single and multi-class embodiments.

A new apersistence pattern window (or class pattern window) begins at 12 in FIG. 1, with a desired utilization (e.g., max desired throughput in the exemplary EVDO mobile communications implementation) being determined at 14. The desired utilization can be obtained from any suitable source by any means within the scope of the invention, for example, from a system management element in a communications system (e.g., from a network switching element associated with a base station resource, etc.) where the desired value may represent a rated throughput amount for the resource that may include desired utilization values for each supported class for multi-class implementations, and where the desired utilization may be changed from time to time manually or by other system management elements. In the example illustrated and described below, for instance, a base station resource has a total target throughput load of 6500 busy hour call attempts (BHCA) in units of calls per hour, although any suitable desired measure of resource utilization can be used.

At 16, a current utilization is determined, which may be an estimate and/or a measurement of the utilization in a previous window or any suitable value obtained by any suitable means to represent the actual, predicted, or estimated current resource utilization (e.g., current throughput). In one example, the incoming traffic throughput is measured in a preceding pattern window or other suitable measurement period and the measured average throughput is used as the current utilization at 16 in creating the apersistence property pattern(s) for the current window. A utilization scaling factor (e.g., average throughput scaling factor ATSF in the illustrated implementation) is then calculated at 18 for the resource, in one example, as the ratio of the desired and current utilizations. Other resource utilization scaling factors can be used, for example, such as a ratio of current utilization divided by desired utilization, with corresponding changes to the threshold values discussed below to implement selective pattern generation according to different ranges of scaling factor values (e.g., little or no throttling for low utilization and more throttling for high current utilization).

The calculated utilization scaling factor is then compared with a first threshold TH1, which can be any suitable value, such as 1.0 in the illustrated example. The comparison at 20 determines whether the scaling factor is in a first low loading range or in a second higher utilization loading range. In the illustrated example, the scaling factor increases with decreasing incoming utilization, wherein a unity scaling factor indicates equal desired and incoming throughput, with scaling factors above 1.0 being in the first range and other values below the threshold being in the second higher current utilization loading range. In a particular application to a mobile communications base station resource, the utilization scaling factor is the ratio of the target BHCA divided by the measured/predicted BHCA of the previous pattern window. In this regard, a scaling factor above 1.0 indicates a low resource loading condition with no need for resource throttling, where smaller values indicate more current demand than desired throughput, in which case one or more levels of resource utilization throttling is employed in accordance with the present invention. In the illustrated example, higher loading situations are selectively managed by comparing the scaling factor to a second lower threshold value (e.g., 0.5) to decide whether moderate or more aggressive throttling is to be used (e.g., whether the scaling factor is in a first or a second portion of the second range). It is noted that where the scaling factor is alternatively computed as actual (or predicted) incoming utilization divided by desired utilization, an equivalent second threshold value of 2.0 could be used, where no throttling is used for scaling factors below 1.0, moderate throttling for values between 1.0 and 2.0, and more aggressive throttling for scaling factors above 2.0. Other utilization factors are possible within the scope of the invention, in which the scaling factor is based at least in part on the current utilization (measured, predicted, etc.) and on a desired utilization, where the scaling factor varies (up or down) as the current utilization changes.

In the present example, a determination is made at 20 as to whether the scaling factor ATSF is greater than the first threshold TH1. If so (YES at 20), ATSF is in a first range and the method proceeds to 22 where an apersistence property pattern is created for the current pattern window with unimpeded apersistence property entries, with the entries then being provided to the devices in each update cycle of the current window at 40, for example, in broadcast messages 82 sent from a base station resource 50 to mobile devices 80, as illustrated in FIGS. 5-8. If, however, the scaling factor ATSF is less than or equal to the threshold TH1 (NO at 20 in FIG. 1, where ATSF is in the second higher loading range), the apersistence property pattern is created at 30 for the current pattern window, including one or more blocking entries along with one or more non-blocking entries, and the entries are provided to the devices in each update cycle of the current window at 40. Such blocking entries are those which, when used by a device in performing an apersistence test, cause the device to fail the test, and therefore effectively block utilization by the device in the corresponding update cycle and any access cycles thereof. The apersistence window is then completed at 42 and the method 10 repeats for the next pattern window as described above. It is noted at this point that in cases where the resource supports prioritized utilization by devices of multiple priority classes, the above procedure is used for each class, with an apersistence property pattern being created at 22 or 30 for each class, with the values thereof being provided to the devices at 40.

Figure 2:
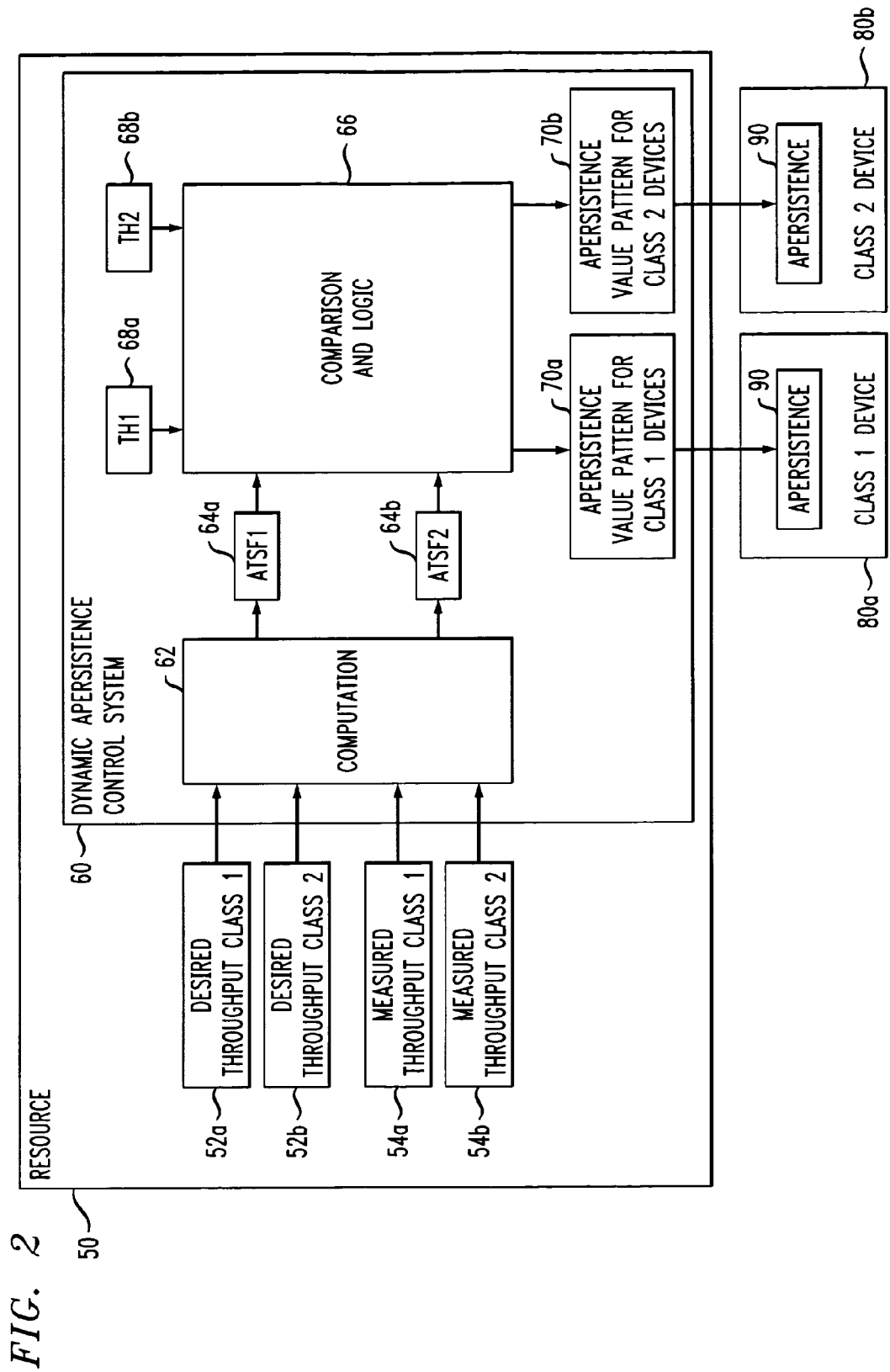
FIG. 2 is a simplified schematic diagram illustrating a communications system base station resource with an apersistence control system in accordance with the invention.
Figure 5:
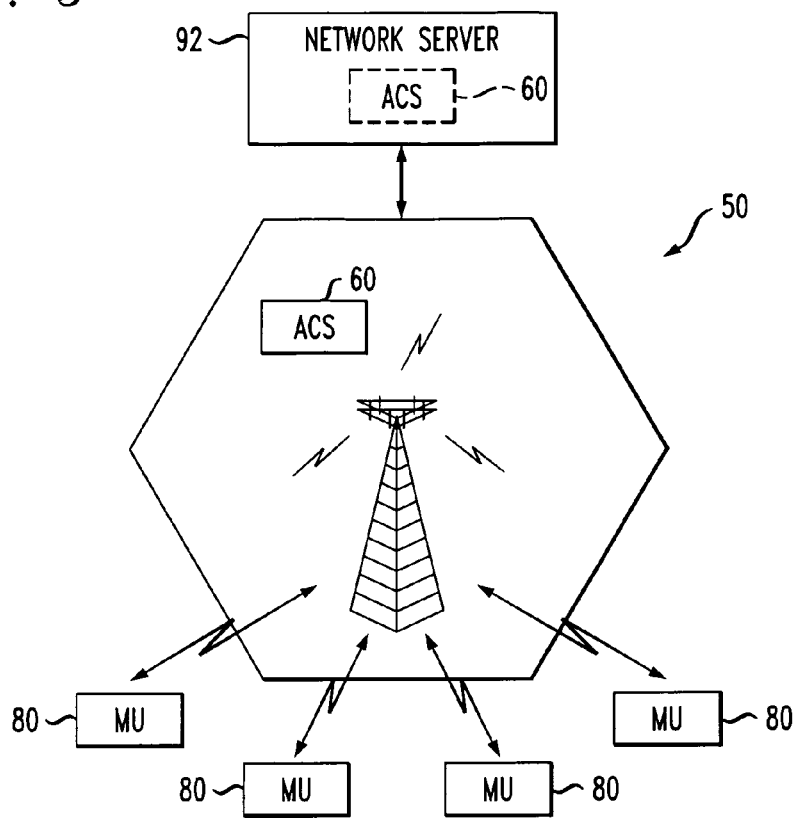
FIG. 5 is a simplified schematic diagram illustrating a mobile communications system with a base station resource providing communications services for a number of mobile communications units, with an apersistence control system operatively associated with the base station in accordance with the present invention.
Figure 6:
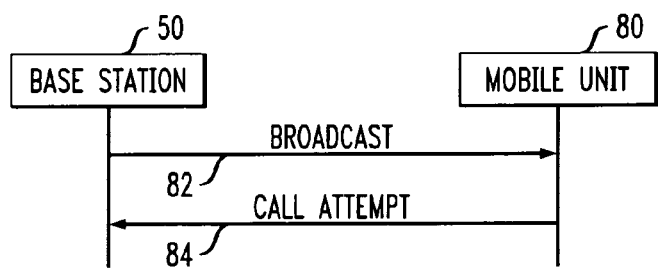
FIG. 6 is a simplified call flow diagram illustrating a broadcast message from the base station to the mobile unit communications devices in FIG. 5 that includes an apersistence property, as well as a call initiation attempt message from a mobile unit to the base station resource for attempting utilization after passing an apersistence test.
Figure 7:
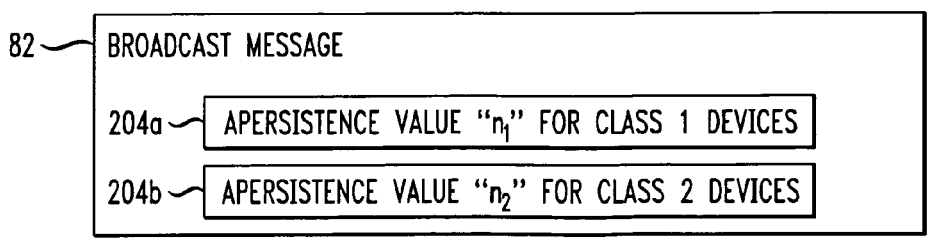
FIG. 7 is a simplified schematic diagram illustrating an exemplary broadcast message including apersistence property values for first and second priority classes in accordance with the invention.

FIG. 2 schematically illustrates an exemplary communications system base station resource 50 servicing a number of mobile communications devices 80, wherein some devices 80a are of a first priority class (e.g., high priority) and others 80b are of a second class (low priority in this example). The resource 50 includes an apersistence control system (ACS) 60 operable to perform the methods of the present invention and the functionality set forth herein. Apersistence control can be implemented in an automated system such as system 60 for dynamic control of apersistence values provided to the devices 80, or may be provided manually, or combinations thereof. The illustrated apersistence control system 60 may be implemented in any suitable manner, such as in hardware, software, programmable logic, etc., or combinations thereof, wherein all such variant implementations are contemplated as falling within the scope of the invention and the appended claims. Further, other implementations of the invention are possible in which the control system 60 is not physically integrated or located in the resource 50 of interest, but is instead implemented in another device, such as a switching element or other network element operatively coupled with the resource to provide the functionality set forth herein. For example, as shown in FIG. 5 below, the ACS 60 may be located in the base station 50 or may alternatively be implemented in a network server 92 operatively associated with the base station resource 50.

As shown in FIG. 2, the apersistence control system 60 receives desired throughput values 52a and 52b, along with measured throughputs 54a and 54b, for the two classes, and a computation subsystem 62 (e.g., hardware, software, logic, or combinations thereof) generates first and second utilization scaling factors (e.g., average throughput scaling factors ATSF1 and ATSF2) 64a and 64b corresponding to the first and second classes, respectively. In the illustrated example, the individual scaling factors 64 are computed in the subsystem 62 as the desired throughput divided by the measured throughput for the corresponding class. The class scaling factors 64 are provided to a comparison and logic subsystem 66, along with first and second threshold values TH1 68a and TH2 68b, respectively, and the subsystem 66 creates apersistence value patterns 70a and 70b for the first and second classes, respectively. It is noted that for multiple priority classes, different sets of first and second threshold values may be provided in the system 60 in accordance with the invention, wherein FIGS. 4A-4D below illustrate several examples of apersistence information including class patterns for two priority classes. The resource 50 provides apersistence property values or entries from the patterns 70 to the devices 80, for instance, in broadcast messages sent at update cycle periods for use by apersistence logic systems 90 in performing apersistence tests in the devices 80 for selectively attempting to initiate calls using the base station resource 50.

While illustrated and described herein in the context of EVDO mobile communications systems, the invention may be employed to control utilization of other resources, and finds utility in association with all forms of media and means of communication, including but not limited to wireless, wireline, LAN, WAN, WIMAX, Blue Tooth, etc. in which prioritized or single class resource management can be used to resolve potential contention over any single resource or multiple resources that are shared among a plurality of devices. In general, the resource 50 or control system 60 associated therewith provides apersistence property information to the devices 80, where the apersistence property values can be provided by any suitable means. In the above wireless implementation, for example, the base station resource 50 sends the apersistence property values to the mobile communications devices 80 in broadcast messages using known wireless communications techniques and apparatus. In situations where the communication media has symmetric propagation properties such that communication from devices to resource(s) potentially interfere physically with communication in the reverse direction (e.g., wired LAN, etc.), a second parallel communication media, such as a parallel LAN may be employed to transport the apersistence information from the resource of contention (or from an apersistence control system operatively associated therewith) to the devices in order to avoid the busy traffic being shaped. In situations where the communication media is not symmetric (for example, wireless), such secondary parallel media is not needed.

Figure 8:
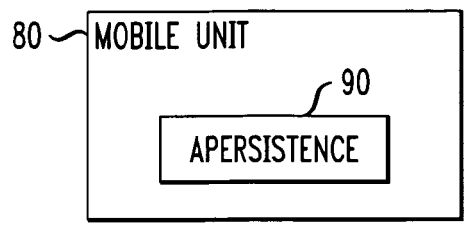
FIG. 8 is a simplified schematic diagram illustrating an exemplary mobile communications device or unit, such as an EVDO compatible cell phone, with apersistence logic for performing an apersistence test using an apersistence property value from the broadcast message of FIG. 7.
Figure 9:
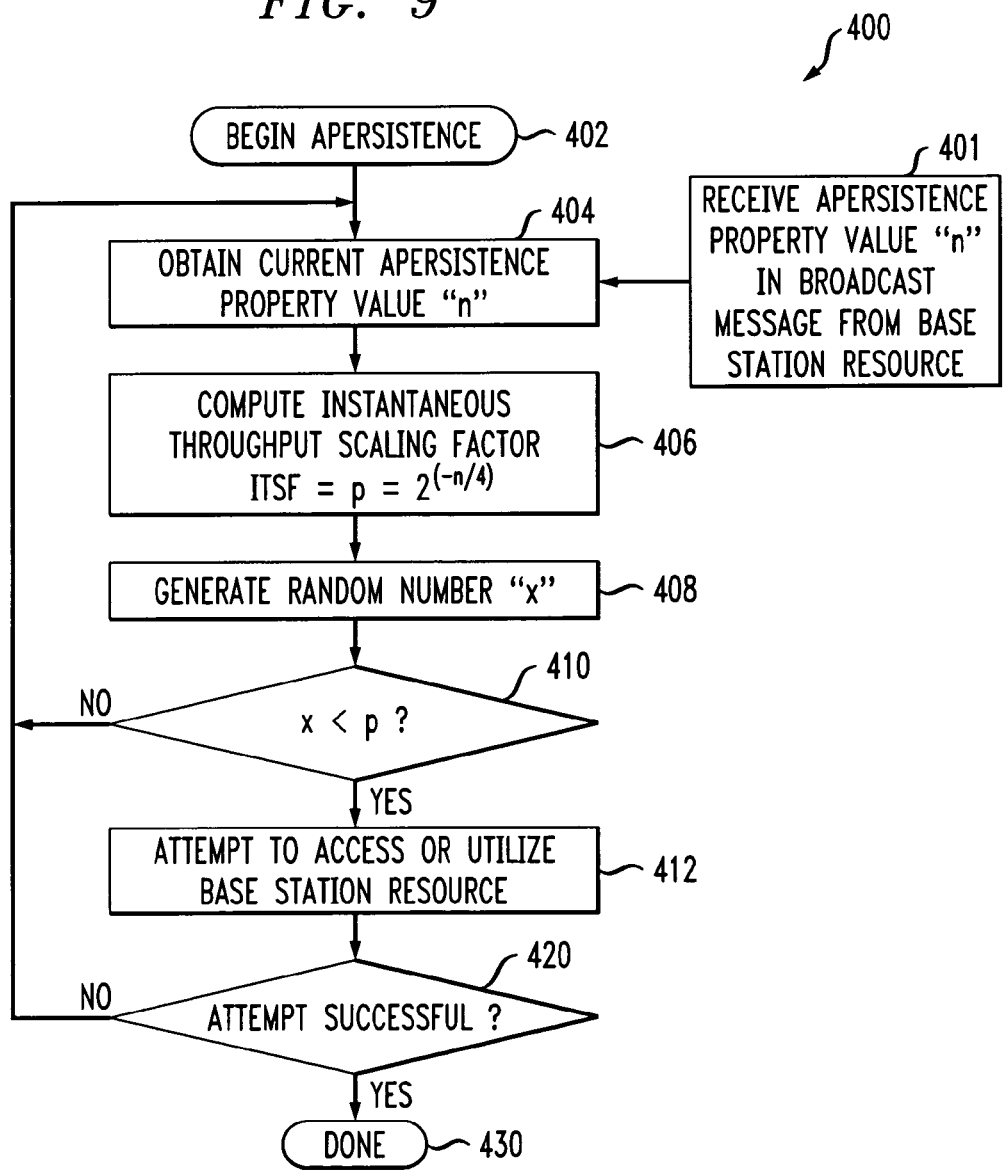
FIG. 9 is a flow diagram illustrating an exemplary apersistence test in the mobile communications device of FIG. 8.

Referring to FIGS. 5-9, in the example of an EVDO Rev. A base station resource 50 (FIG. 5) and EVDO compatible mobile communications units 80, the base station 50 periodically sends broadcast messages 82 (FIGS. 6 and 7) to the devices 80 (e.g., at least once during each apersistence update cycle), including apersistence values 204a and 204b (FIGS. 4A-4D) corresponding to the first and second (e.g., high and low) priorities in the illustrated example. In the case of EVDO, up to four different classes can be supported, wherein any arbitrary number of classes can be used in an implementation of the present invention, with two classes being described herein for the sake of illustration only. In the illustrated embodiment, moreover, the apersistence property values are shown as "$n_1$" and "$n_2$" for the first and second classes, respectively, where each "n" value is an integer in a range of 0 to 63 inclusive, although other value formats can be used. As shown in FIGS. 8 and 9, each EVDO mobile unit 80 (FIG. 8) includes apersistence logic or firmware 90 to implement an apersistence test 400, as shown in FIG. 9, using the appropriate "n" value for a given device priority class. The apersistence property value "n" is received at 401 as the apersistence updates are provided in the form of a broadcast message from the base station resource 50, where the apersistence test 400 operates essentially asynchronously from the update. The device apersistence test 400 begins at 402, wherein the device 80 obtains the most recently received apersistence property value ("n" value) 204 at 404 sent in a base station broadcast message 82 and computes an instantaneous throughput scaling factor (ITSF)=p=$2^{-n/4}$ at 406. A random number "x" is generated at 408 (e.g., in a range of 0 to 1 inclusive) and the "x" value is compared to the ITSF (p) at 410 to determine if the device 80 should attempt a utilization (e.g., whether to initiate a call attempt in the current access cycle or not). If the test fails (e.g., NO at 410 for x greater than or equal to p), the method 400 returns to 404 and another test is performed in the subsequent access cycle. Otherwise (YES at 410), a utilization attempt is made at 412, and if successful (YES at 420), the apersistence method 400 ends at 430. If an attempt is unsuccessful (NO at 420), the method 400 returns to run another apersistence test at 404 as described above.

For example, if n=8, the apersistence logic 90 compares a randomly generated number x to the ITSF=$2^{-8/4}$=0.25. If x<0.25, the mobile device 80 is allowed to attempt an access. If not, the device 80 must wait for the next access cycle to retry again. It is noted that there may be a maximum number of apersistence tests (e.g., 4/p) that the device 80 undergoes and fails before a utilization attempt is allowed. In one example for n=8, the device 80 is allowed to attempt an access on the 16th cycle following 15 test failures. It is further noted that for n=0, the mobile unit 80 is ensured of passing the apersistence test 400, wherein this apersistence property value is termed "unimpeded". When n=63, the logic 90 blocks the attempt, and need not perform the apersistence test 400. Thus, the apersistence property value n=63 is referred to herein as a "blocking" entry value, which essentially blocks a call attempt access or other utilization of the base station resource 50 by the mobile device 80 in a given apersistence update cycle. Other n values between 0 and 63 are termed "non-blocking" values, including the unimpeded entry value n=0, where the apersistence test result is determined in a given device according to the "n" value provided by the base station and the random number "x" generated in that device. Where a given device 80 passes the apersistence test of a given access cycle, an attempt is made to access or otherwise utilize the resource, such as a mobile communications device 80 attempting to initiate a call using the base station resource 50. In this regard, the device 80 may make multiple physical utilization attempts corresponding to a single logical attempt when the apersistence test is passed. For example, in the wireless EVDO Rev. A standard, a mobile device 80 attempting to access the network may send multiple access probes at increasing power levels to the base station 50 until a maximum number of failed attempts is reached or until access is successful in initiating a call.

Referring now to FIGS. 3A-4D, FIGS. 3A and 3B show a detailed flow diagram of an exemplary method 100 for dynamic utilization control for a wireless base station resource (resource 50 above) and FIGS. 4A-4D illustrate several exemplary apersistence property pattern information sets 200 including patterns 70a and 70b for the first and second classes having apersistence property entries 204 generated using the systems and methods of the invention. An apersistence pattern window begins at 102 in FIG. 3A, with various exemplary pattern windows 202 being shown in FIGS. 4A-4D having eight entries 204 each. While the exemplary patterns 200 are illustrated as having eight entries 204 for each pattern window 202, it will be appreciated that the window length (e.g., the number of property entries 204 per window 202) can be changed dynamically for each class. For example, the number of entries 204 per pattern window 202 may be dynamically set to the smallest integer number in which the entries 204 can provide for the substantially proportional distribution and alternating values as set forth herein for cases where the scaling factor is in the second range (e.g., below the first threshold). Furthermore, the granularity of the proportionality may be balanced against the ability to dynamically respond to changing loading conditions, which may be a consideration in determining the window size, together with the possibility that several different class patterns may have differing distribution proportionality values for distribution of blocking entries 204 within non-blocking entries 204. In addition, implementations are possible wherein patterns for different classes have different window lengths. Also, patterns for different classes can be staggered or offset in time, which may be advantageous to smooth out accumulation of blocked devices undergoing the apersistence testing across different classes.

In accordance with the invention, the apersistence pattern information 200a of FIG. 4A includes unimpeded entries 204a and 204b (e.g., n=0) for scaling factors in a first range associated with low resource loading conditions (e.g., ATSF1 64a and ATSF2 64b in FIG. 2) above the first threshold TH1 (=1.0), with one or more blocking entries (e.g., n=63) being included in FIGS. 4B-4D in the class pattern(s) for lower scaling factor values (e.g., where one or both of the scaling factors 64 are outside the first range with values less than or equal to 1.0), as in the method 10 above. In this manner, the method 100 provides one or more blocking entries 204 (n=63) in the class patterns 70 for scaling factors in a second higher loading range where the corresponding class utilization scaling factor ATSF is less than or equal to TH1 68a, in which the blocking entries 204 may be maximally dispersed between non-blocking entries 204 in the pattern 70 (e.g., as shown in pattern 70b of FIG. 4B). In this implementation, moreover, if the class 2 utilization scaling factor ATSF2 is in a first portion of the second range (less than or equal to TH1 but greater than a second threshold value TH2=0.5 in one example), the corresponding pattern 70b in the information 200b of FIG. 4B includes at least one blocking entry 204b (n=63) and at least one unimpeded entry (n=0) with a ratio of unimpeded to total entries 204b being substantially proportional to the ratio of the desired throughput divided by the current throughput to provide a moderate amount of system throttling. If the class scaling factor ATSF2 is less than or equal to TH2, moreover, the class pattern 70b in the information 200c and 200d includes blocking and non-blocking entries 204b (FIGS. 4C and 4D), with the non-blocking pattern entries having a value determined according to the utilization scaling factor for aggressive throttling of the current incoming throughput.

The max desired throughput is determined for each class at 104 and the incoming (e.g., current) throughput is determined at 106 for each priority class. The average throughput scaling factor ATSF is then calculated at 108 as the desired throughput divided by the incoming throughput for each class at 108. The ATSF for each class is then compared to a first threshold TH1 (e.g., 1.0) at 110, and if the ATSF for a class is greater than TH1 (YES at 110), the method 100 proceeds to 112 in FIG. 3B, where an apersistence property pattern is created for that class to include unimpeded apersistence property entries. FIG. 4A illustrates an example of pattern information 200a with patterns 70a and 70b including all unimpeded entries 204a and 204b, respectively, having a property value n=0. The method proceeds to 140 in FIG. 3A, where the apersistence property values or entries are provided from the patterns to the devices at apersistence update cycle periods, and the pattern window ends at 142.

Where a class scaling factor is less than or equal to the first threshold TH1 (NO at 110 in FIG. 3A), the method 100 proceeds to 120 where a determination is made as to whether the class scaling factor is greater than the second threshold value (e.g., 0.5 in the illustrated embodiment). If so (YES at 120), the class scaling factor is in the first portion of the second range and the method 100 proceeds to 122 in FIG. 3B, where the class apersistence pattern 70 is created including one or more blocking entries 204 (n=63) and one or more unimpeded entries 204 (N=0), with a ratio of unimpeded to total entries 204 being substantially proportional to the ratio of the desired throughput divided by the current throughput. The blocking entries 204 may optionally be maximally dispersed between the unimpeded entries 204 at 124 in FIG. 3B, and the method proceeds to 140 in FIG. 3A, where the apersistence property values or entries are provided from the patterns 70 to the devices 80 at apersistence update cycle periods as described above. FIG. 4B shows exemplary pattern information 200b in the situation where the scaling factor ATSF1 for class 1 is above 1.0, with all unimpeded entries 204a (N=0) in the first class pattern 70a, and where the second scaling factor ATSF2 for class 2 is in a first portion of the second range between 0.5 and 1.0, with the second class pattern 70b having two blocking entries 204b (N=63) maximally interleaved or dispersed with six unimpeded entries 204b (N=0). In this regard, where the second scaling factor ATSF2 is exactly 0.75, the ratio of six unimpeded entries 204b to the total number of eight entries 204b in the pattern 70b is proportional to the scaling factor ATSF2, although exact proportionality is not required. Moreover, the window length may be dynamically adjusted to provide improved proportionality, where the adjustment may be for all classes or different classes can have different window lengths, although shorter window lengths may generally allow better dynamic response of the system 60 to changing utilization conditions in the resource 50, and may therefore be preferred in many implementations. This condition in FIG. 4B provides for moderate throttling of the traffic for the second class (ATSF2 between 0.5 and 1.0), whereas the high priority traffic (ATSF1 greater than 1.0) is unimpeded.

Figure 3A:
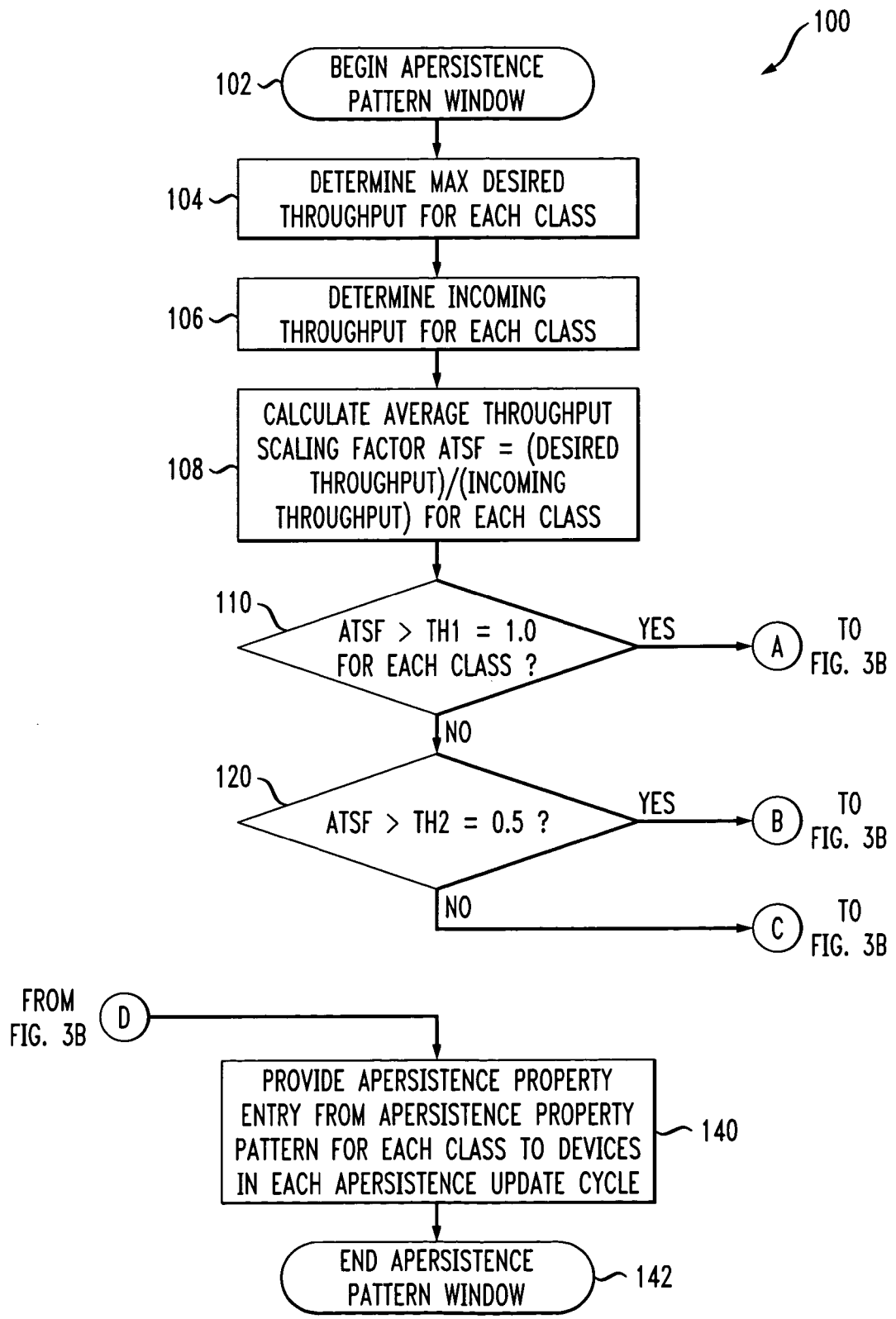
FIGS. 3A and 3B provide a flow diagram illustrating a detailed method for controlling utilization of a base station resource in a mobile communications system in accordance with the invention.
Figure 3B:
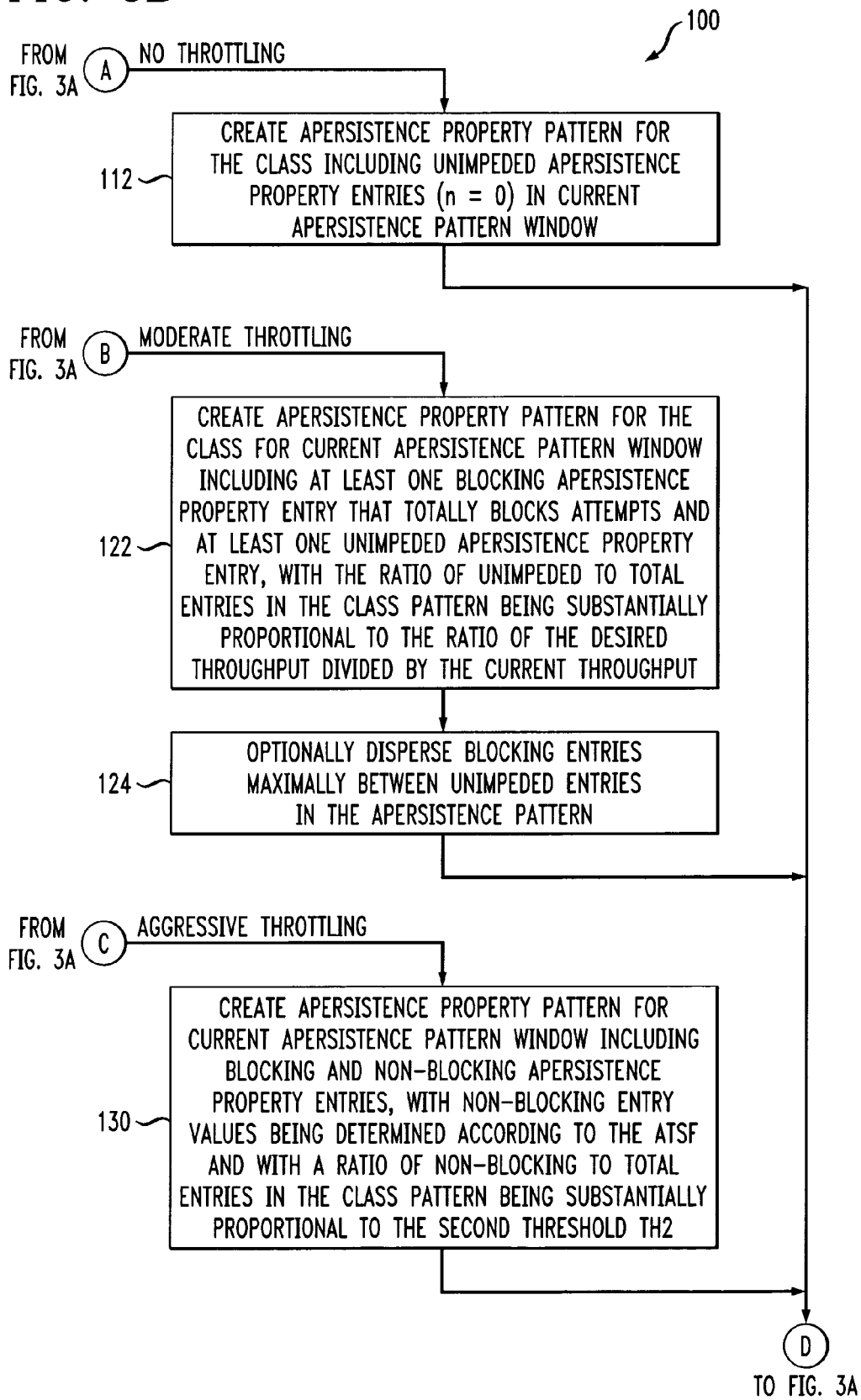

A third situation exists where a class scaling factor ATSF is in a second portion of the second range corresponding to still higher utilization loading with the scaling factor being less than or equal to the second threshold TH2 (NO at 120 in FIG. 3A). In this case, the method 100 proceeds to 130 in FIG. 3B for more aggressive throttling. As an example, for a second scaling factor ATSF2 of 0.105, the class pattern 70b is created at 130 including alternating blocking and non-blocking entries 204, with the non-blocking entries 204 having values determined according to the class ATSF. In a more general case of this aspect of the invention, a ratio of the number of non-blocking entries to total pattern entries is substantially proportional to the second threshold value (when utilization scaling factor is desired utilization divided by current utilization), wherein the aggressive blocking class pattern is not limited to having the blocking entry occur every other apersistence update cycle, where this is one case with the second threshold TH=0.5. In another example with the second threshold TH2 being 0.333, the aggressive throttling class pattern 70 would include two blocking cycles followed by a non-blocking cycle for a total of three entries in each pattern window, where the ratio of non-blocking entries to the total number of entries in a pattern window is roughly proportional to the second threshold value TH2, with the apersistence value in the non-blocking entries being determined according to the class ATSF. In another possible implementation with the second threshold TH2=0.667, the aggressive blocking class pattern would have two non-blocking entries, followed by a blocking entry in each pattern of three entries, where the apersistence value in the non-blocking entries is driven by the ATSF. Thus, for the illustrated case in which the utilization scaling factor decreases with increasing current utilization, the second portion of the second range includes utilization scaling factors for which the ratio of the desired utilization divided by the current utilization is less than or equal to a number K, where K is a predetermined threshold number (e.g., TH2 in the above example) greater than zero and less than or equal to 1.0. In this case, where the utilization scaling factor is in the second portion of the second range, the ratio of the number of non-blocking entries divided by the total number of entries in the pattern is substantially proportional to K. In other implementations of the invention, the second threshold value may change.

In this second portion of the second range, moreover, the value of the non-blocking entries is determined according to the class scaling factor, where the determination of the non-blocking apersistence property entry values can be by any suitable means, including formulas, lookup tables, etc., where the non-blocking values are related in some fashion to the class ATSF. Table 1 below illustrates the relationship between the apersistence property "n" values (column 1 for values from 0 to 62), instantaneous scaling factor values ITSF=$p=2^{-n/4}$ (column 2), an optional maximum number of failed attempts before a device 80 attempts a utilization (column 3), an instantaneous spread (1/p in column 4), and corresponding average throughput scaling factors ATSF and the reciprocal 1/ATSF (columns 5 and 6, respectively), in one implementation of the invention. The values are shown in the table for nearly all possible values in the wireless EVDO Rev. A standard, where the case for N=63 instructs the mobile device 80 to refrain from any attempt at utilization, and the device 80 typically operates to notify upper software layers of its failure for this case (e.g., N=63 is thus a "blocking" value in the EVDO Rev. A example). Column 4 provides a feel for the meaning of the ITSF "p" values in the second column, where, for instance, n=23, p=0.018581 meaning the delay effectively spreads the access attempts by a factor of 53.8.

TABLE 1

| n | ITSF $p = 2^{(-n/4)}$ | Max. Failures (4/p) | Inst. Spread Factor (1/p) | ATSF | Avg. Spread 1/ATSF |
|---|---|---|---|---|---|
| 0 | 1.000000 | 4.000000 | 1.000000 | 0.500000 | 2.000000 |
| 1 | 0.840896 | 4.756828 | 1.189207 | 0.488175 | 2.048448 |
| 2 | 0.707107 | 5.656854 | 1.414214 | 0.474113 | 2.109202 |
| 3 | 0.594604 | 6.727171 | 1.681793 | 0.457419 | 2.186179 |
| 4 | 0.500000 | 8.000000 | 2.000000 | 0.437744 | 2.284439 |
| 5 | 0.420448 | 9.513657 | 2.378414 | 0.414946 | 2.409955 |
| 6 | 0.353553 | 11.313708 | 2.828427 | 0.389208 | 2.569317 |
| 7 | 0.297302 | 13.454343 | 3.363586 | 0.361058 | 2.769638 |
| 8 | 0.250000 | 16.000000 | 4.000000 | 0.331271 | 3.018675 |
| 9 | 0.210224 | 19.027314 | 4.756828 | 0.300739 | 3.325137 |
| 10 | 0.176777 | 22.627417 | 5.656854 | 0.270339 | 3.699061 |
| 11 | 0.148651 | 26.908685 | 6.727171 | 0.240835 | 4.152226 |
| 12 | 0.125000 | 32.000000 | 8.000000 | 0.212829 | 4.698610 |
| 13 | 0.105112 | 38.054628 | 9.513657 | 0.186746 | 5.354870 |
| 14 | 0.088388 | 45.254834 | 11.313708 | 0.162843 | 6.140894 |
| 15 | 0.074325 | 53.817371 | 13.454343 | 0.141234 | 7.080425 |
| 16 | 0.062500 | 64.000000 | 16.000000 | 0.121925 | 8.201797 |
| 17 | 0.052556 | 76.109255 | 19.027314 | 0.104835 | 9.538798 |
| 18 | 0.044194 | 90.509668 | 22.627417 | 0.089834 | 11.131698 |
| 19 | 0.037163 | 107.634741 | 26.908685 | 0.076755 | 13.028460 |
| 20 | 0.031250 | 128.000000 | 32.000000 | 0.065419 | 15.286192 |
| 21 | 0.026278 | 152.218511 | 38.054628 | 0.055639 | 17.972864 |
| 22 | 0.022097 | 181.019336 | 45.254834 | 0.047238 | 21.169359 |
| 23 | 0.018581 | 215.269482 | 53.817371 | 0.040045 | 24.971903 |
| 24 | 0.015625 | 256.000000 | 64.000000 | 0.033904 | 29.494968 |
| 25 | 0.013139 | 304.437021 | 76.109255 | 0.028674 | 34.874716 |
| 26 | 0.011049 | 362.038672 | 90.509668 | 0.024229 | 41.273096 |
| 27 | 0.009291 | 430.538965 | 107.634741 | 0.020457 | 48.882723 |
| 28 | 0.007812 | 512.000000 | 128.000000 | 0.017261 | 57.932674 |
| 29 | 0.006570 | 608.874043 | 152.218511 | 0.014557 | 68.695383 |
| 30 | 0.005524 | 724.077344 | 181.019336 | 0.012271 | 81.494847 |
| 31 | 0.004645 | 861.077929 | 215.269482 | 0.010340 | 96.716376 |
| 32 | 0.003906 | 1024.000000 | 256.000000 | 0.008709 | 114.818190 |
| 33 | 0.003285 | 1217.748086 | 304.437021 | 0.007334 | 136.345218 |
| 34 | 0.002762 | 1448.154688 | 362.038672 | 0.006175 | 161.945500 |
| 35 | 0.002323 | 1722.155858 | 430.538965 | 0.005198 | 192.389695 |
| 36 | 0.001953 | 2048.000000 | 512.000000 | 0.004375 | 228.594280 |
| 37 | 0.001642 | 2435.496172 | 608.874043 | 0.003681 | 271.649142 |
| 38 | 0.001381 | 2896.309376 | 724.077344 | 0.003097 | 322.850383 |
| 39 | 0.001161 | 3444.311717 | 861.077929 | 0.002606 | 383.739342 |
| 40 | 0.000977 | 4096.000000 | 1024.000000 | 0.002192 | 456.148992 |
| 41 | 0.000821 | 4870.992343 | 1217.748086 | 0.001844 | 542.259118 |
| 42 | 0.000691 | 5792.618751 | 1448.154688 | 0.001551 | 644.661939 |
| 43 | 0.000581 | 6888.623434 | 1722.155858 | 0.001305 | 766.440143 |
| 44 | 0.000488 | 8192.000000 | 2048.000000 | 0.001097 | 911.259681 |
| 45 | 0.000411 | 9741.984686 | 2435.496172 | 0.000923 | 1083.480135 |
| 46 | 0.000345 | 11585.237503 | 2896.309376 | 0.000776 | 1288.285947 |
| 47 | 0.000290 | 13777.246868 | 3444.311717 | 0.000653 | 1531.842495 |
| 48 | 0.000244 | 16384.000000 | 4096.000000 | 0.000549 | 1821.481692 |
| 49 | 0.000205 | 19483.969372 | 4870.992343 | 0.000462 | 2165.922700 |
| 50 | 0.000173 | 23170.475006 | 5792.618751 | 0.000388 | 2575.534409 |
| 51 | 0.000145 | 27554.493735 | 6888.623434 | 0.000327 | 3062.647577 |
| 52 | 0.000122 | 32768.000000 | 8192.000000 | 0.000275 | 3641.926031 |
| 53 | 0.000103 | 38967.938744 | 9741.984686 | 0.000231 | 4330.808097 |
| 54 | 0.000086 | 46340.950012 | 11585.237503 | 0.000194 | 5150.031557 |
| 55 | 0.000073 | 55108.987470 | 13777.246868 | 0.000163 | 6124.257930 |
| 56 | 0.000061 | 65536.000000 | 16384.000000 | 0.000137 | 7282.814868 |
| 57 | 0.000051 | 77935.877489 | 19483.969372 | 0.000115 | 8660.579025 |
| 58 | 0.000043 | 92681.900024 | 23170.475006 | 0.000097 | 10299.025966 |
| 59 | 0.000036 | 110217.974940 | 27554.493735 | 0.000082 | 12247.478728 |
| 60 | 0.000031 | 131072.000000 | 32768.000000 | 0.000069 | 14564.592619 |
| 61 | 0.000026 | 155871.754978 | 38967.938744 | 0.000058 | 17320.120946 |
| 62 | 0.000022 | 185363.800047 | 46340.950012 | 0.000049 | 20597.014839 |

FIG. 4C shows a situation in which the class 1 scaling factor ATSF1 remains above TH1, and the corresponding pattern 70a includes all unimpeded entries 204a (N=0), whereas the current incoming class 2 traffic has increased to the point where the second scaling factor ATSF2 is about 0.105. In this situation, the second pattern 70b is constructed at 130 in FIG. 3B including alternating blocking entries 204b (N=63) and non-blocking entries 204b having values (n=17 in this example) determined according to the second scaling factor ATSF2. In the base station resource 50, a table such as Table 1 above may be maintained, and when the ATSF2 value is determined (e.g., based on current incoming and desired throughputs), the value for "n" is selected for the non-blocking pattern entries 204b in accordance therewith. As shown in Table 1, the value closest to ATSF2 (e.g., 0.1048) is located in the fifth column, and the corresponding "n" value is used (e.g., n=17) for the non-blocking entries 204b in the pattern 70b as shown in FIG. 4C. For this case, the class 2 devices 80 will individually compute the instantaneous scaling factor ITSF=p=$2^{-17/14}$=0.0526. As shown in FIG. 4C, the two classes may thus be operated at different levels of throttling, thereby facilitating prioritized provision of utilization to the shared base station resource 50.

A brief description is now provided of the relationship between the instantaneous throughput scaling factor (ITSF) operable in the exemplary mobile communications devices 80 and the average throughput scaling factor (ATSF) calculated at the EVDO Rev. A base station resource 50, for one possible situation for the aggressive throttling where apersistence is effectively turned on and off every other cycle (e.g., by the base station resource 50 providing alternating blocking and non-blocking pattern entries 204). In essence, the goal is to carry forward the number of devices 80 failing the apersistence test in a given cycle to the next cycle and subjecting this plus the new incoming attempts to the apersistence test. It is assumed for the following explanation that R is the rate of utilization attempts per cycle. And p is the instantaneous throughput scaling factor (ITSF) described above (e.g., In EVDO Rev. A, p=$2^{-n/4}$ as shown in column 2 in Table 1). It will be appreciated that only the devices 80 will know of the ITSF information, and that the device 80 will not be aware of the average throughput scaling factor (ATSF) determined by the base station resource 50. 2N is assumed to be the number of access cycles in a given apersistence update cycle, where the apersistence is effectively turned on for N consecutive access cycles followed by N consecutive cycles being turned off. In this instance, the average throughput is given by the following equations 1-3:

$$\text{Avg Throughput} = \sum_{i=1}^{N} Ti/2N \quad (1)$$

$$T1 = Rp, \text{ and} \quad (2)$$

$$Ti = \left\{\left[(i-1)R - \sum_{j=1}^{i-1} Tj\right] + R\right\}p, \quad (3)$$

with the portion in the straight brackets representing the carryover from previous cycles and the final "R" representing the current influx in equation 3.

The average throughput scaling factor (ATSF) is given in equation 4:

$$ATSF = [\text{Avg Throughput}]/R = \sum_{i=1}^{n} Ti/2NR \quad (4)$$

In the wireless EVDO Rev. A example above, the apersistence property update cycles each include 8 access channel cycles, in which case the above calculation can be performed for 8 consecutive access channels being ON (non-blocking "n" values used in the aggressive throttling case), followed by 8 consecutive access channels being OFF (e.g., blocking "n" values). The average throughput scale factor (ATSF; column 5 in Table 1) in this example is related to the instantaneous throughput scaling factor p (ITSF; column 2 Table 1) via the following equation 5:

$$ATSF=9/4 [1-(7/3)p+(7/2)p^2-(7/2)p^3+(7/3)p^4-p^5+(1/4)p^6-(1/36)p^7]p, \quad (5)$$

where the sixth column in Table 1 above is the effective average spread of the apersistence and is simply the inverse of ATSF. It is noted in this regard that equations 1 and 4 can be modified when the relative number of blocking to non-blocking entries changes for aggressive throttling. In one example, with a pattern having two blocking entries and one non-blocking entry, the value "2N" in equations 1 and 2 would be replaced by "3N", and the corresponding second threshold TH2 would be 0.333. Even for relative ratios where there are more unblocked windows compared to blocked ones, appropriate modifications to equations 1 and 4 can be made where the numerator accounts for access cycles when apersistence is unblocked in an apersistence pattern, while the denominator accounts for the total number of access/utilization cycles in an apersistence pattern.

Yet another possible example is shown in FIG. 4D, in which the second scaling factor ATSF2 remains at about 0.10, but the high priority traffic increases to where ATSF1 now drops to about 0.33. In this case, the first class apersistence property pattern 70a is constructed at 130 in FIG. 3B to provide aggressive throttling including alternating blocking entries 204a (n=63) and non-blocking entries 204a having values n=8 determined according to ATSF1. In this instance, the class 1 devices will compute the instantaneous scaling factor ITSF=p=$2^{-8/4}$=0.25. In this manner, the illustrated EVDO Rev. A embodiment provides for determining the non-blocking entries 204 according to the utilization scaling factor. It is noted that while the above example employs one specific technique for determining the "n" value based on the ATSF value, other techniques can be used, where the above example is not a strict requirement of the invention. It is noted in FIGS. 3A and 3B, that for systems in which the resource supports use by devices of multiple priority classes, the above procedures can be employed for each class, with an apersistence property pattern being created at 110-130 for each class.

Although much of the detailed description has used a straightforward definition for the utilization scaling factor being desired utilization divided by actual (measured or predicted) utilization, the utilization scaling factor may be any arbitrary function of desired and actual utilizations (varies with current utilization), so long as the function varies with changing actual utilizations. To illustrate this point, consider the following utilization scaling factor SF':

$$SF'=(U_C+1)^3/(U_D+2), \quad (6)$$

where $U_C$ is the current utilization (e.g., any value indicative of current utilization, whether measured, predicted, etc.) and $U_D$ is the desired utilization. A table (not shown) that relates the instantaneous throughput scaling factor to the average throughput scaling factor SF', similar to that of Table 1, can be generated by substituting equation 1 above for $U_C$ in equation 6 and by substituting R for $U_D$ in equation 6:

$$ATSF' = \left[\left(\sum_{i=1}^{N} Ti/2N\right)+1\right]^3 / (R+2), \quad (7)$$

where in this case N is the number of access cycles in an apersistence update cycle and $T_i$ is related to the instantaneous throughput scaling factor (ITSF or p) via equations 2 and 3 over access cycles that are not blocked. Equation 7 uses the form of equation 1 that implements alternating apersistence entries being blocking and non-blocking, where value of the non-blocking entries can be determined according to the utilization scaling factor (e.g., ATSF' by a lookup table generated using equation 7 in this example). Note that in this general example, equation 6 cannot be reduced to a function of $U_D/U_C$, so the thresholds between the first and second ranges, as well as between the first and second portions within the second range, cannot be expressed with SF' being compared to a constant, but rather against a function of $U_D$ (or equivalently $U_C$, though not as convenient). For example, the first threshold commonly used in previous examples where $U_D=U_C$ is obtained by substituting $U_D$ for $U_C$ in equation 6:

$$TH1'=(U_D+1)^3/(U_D+2), \quad (8)$$

while the second threshold commonly used in previous examples where $U_D/U_C=0.5$ (drives use of alternating blocking and non-blocking apersistence entries in second portion in second range) is obtained by substituting $2U_D$ for $U_C$ in equation 6 as the following equation 9:

$$TH2'=(2U_D+1)^3/(U_D+2). \quad (9)$$

Hence, in this general case where the utilization scaling factor cannot be reduced to a function of $U_D/U_C$, the predetermined value $U_D$ is used to determine the thresholds between the first and second ranges as well as between the first and second portions within the second range. Note however, that equation 7 does not explicitly depend on $U_C$ or $U_D$, and thus provides a relationship between values of ITSF (p) and ATSF', similar to Table 1.

Using SF' would consist of determining the desired and actual (measure or predicted) utilizations ($U_D$ and $U_C$) and calculating SF' via equation 6. If SF' is between TH1' and TH2', SF' is the first portion in the second range, so use moderate throttling where apersistence pattern window consists of one or more blocking entries and one or more unimpeded entires with ratio of number of unimpeded to total in pattern window being substantially proportional to $U_D/U_C$. If SF' is on other side of TH1', SF' is in first range, so use unimpeded entries in apersistence pattern window. Else, SF' must be in second portion in second range, so use aggressive throttling according to ATSF' mapping to ITSF (p) provided by table that is generated using equation 7.

Actually, the particular example in equation 6 shows increasing SF' versus increasing actual utilization $U_C$. So, it is already known that SF'≦TH1' corresponds to range 1 of low resource loading for no throttling, TH1'<SF'≦TH2' corresponds to portion 1 within range 2 for moderate throttling, and TH2'<SF' corresponds to portion 2 within range 2 for aggressive throttling. However, the previous paragraph exercised logic avoiding knowledge of the utilization scaling factor increasing or decreasing as current utilization increases.

Equation 7 can be modified to handle N contiguous non-blocking access channels in an apersistence update cycle consisting of M access cycles as:

$$ATSF' = \left[\left(\sum_{i=1}^{N} Ti/M\right)+1\right]^3 / (R+2), \quad (10)$$

where the corresponding change to TH2' in equation 9 would be ($U_D/U_C=N/M \to U_C=(M/N)U_D$):

$$TH2'=[(M/N)U_D+1]^3/(U_D+2) \quad (11)$$

Figure 10:
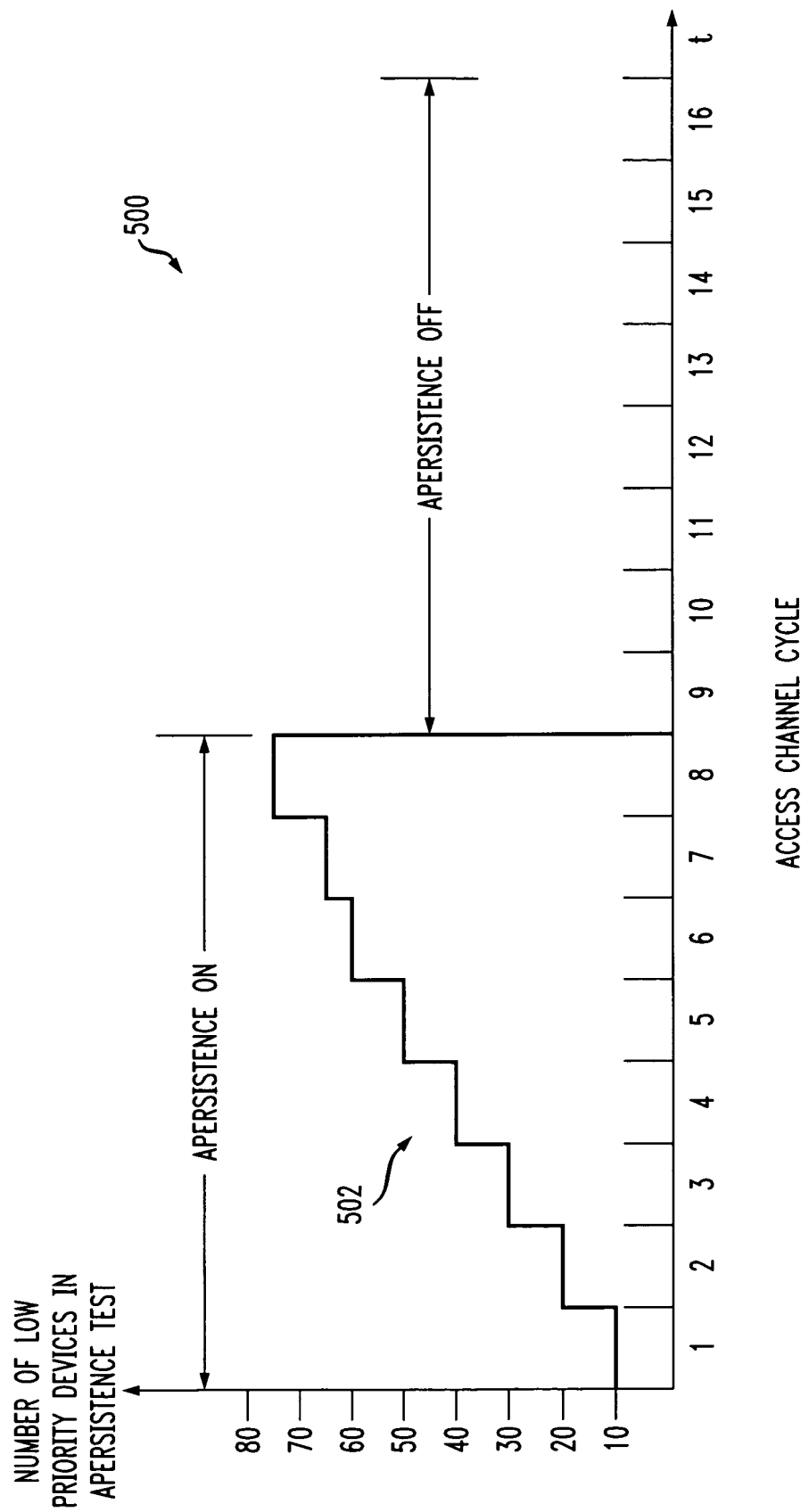
FIG. 10 is a plot illustrating the number of low priority devices undergoing an apersistence test, in which the number of devices failing the test and remaining to retry increases nearly linearly from access cycle to access cycle when non-blocking apersistence entries are provided, and then drops when blocking values are provided.

Referring now to FIG. 10, a plot 500 illustrates the number of low priority devices undergoing an apersistence test as a function of time, in which the number of devices failing the test and remaining to retry increases nearly linearly (e.g., at 502 in FIG. 10) from access cycle to access cycle when non-blocking apersistence entries are provided, and then drops when blocking values are provided, for the above case in which aggressive throttling is used. Within an apersistence update cycle that is ON (non-blocking apersistence values are used), few device access attempts will succeed at the beginning, but more will succeed late in that update cycle, perhaps resulting in collisions for high loading situations. The inventor has appreciated that the illustrated case having (number of non-blocking update cycles)/(total number of update cycles in pattern)>0.5 will exaggerate this effect. Even if collisions are not a problem, the distribution of successes across cycles will not be as smooth/flat. Also, there will be longer delays for successful access/utilization on average, since the mobile devices 80 are allowed to keep on trying for a longer period of time, with the ITSF being adjusted lower to maintain the same overall average utilization as compared to using ratio of 0.5. On the other hand, having (number of non-blocking cycles)/(total number of cycles in pattern)<0.5, will result in more collisions due to squeezing the same overall bandwidth (per class) into a narrower window, at least when the ratio is <<0.5. Thus, the case of TH2=0.5 may advantageously provide superior performance.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for controlling utilization of a resource or pool of resources by a plurality of devices, the method comprising:
   determining a utilization scaling factor for a resource or pool of resources based at least in part on current utilization, where the value of the utilization scaling factor varies as the current utilization changes;
   creating an apersistence property pattern comprising a plurality of apersistence property entries corresponding to apersistence update cycles of an apersistence pattern window, wherein the plurality of apersistence property entries of the apersistence property pattern form a series of apersistence property entries corresponding to sequential apersistence update cycles of the apersistence pattern window, wherein the pattern includes unimpeded entries if the utilization scaling factor is in a first range corresponding to low current utilization, and wherein the pattern includes at least one blocking entry and at least one non-blocking or unimpeded entry if the utilization scaling factor is in a second range corresponding to higher current utilization; and
   providing an apersistence property pattern entry one at a time in sequence from the apersistence property pattern to the devices in each apersistence update cycle of the apersistence pattern window.

2. The method of claim 1, wherein if the utilization scaling factor is in the first range, the pattern includes all unimpeded entries.

3. The method of claim 1, wherein if the utilization scaling factor is in the second range, blocking entries are dispersed between non-blocking entries in the pattern.

4. The method of claim 1, wherein devices of a plurality of different priority classes are able to utilize the resource, wherein a class utilization scaling factor is determined for each priority class, wherein a class apersistence property pattern is created for each priority class, wherein apersistence property pattern entries are provided from the class apersistence property patterns to the devices in each apersistence update cycle of the apersistence pattern window, wherein creating an apersistence property pattern comprises creating a plurality of apersistence property entries for the apersistence property pattern of each class based on the corresponding class utilization scaling factor, wherein if the utilization scaling factor for a given class is in the first range, the pattern for the given class includes unimpeded entries, and wherein if the utilization scaling factor for the given class is in the second range, the pattern for the given class includes at least one blocking entry and at least one non-blocking entry.

5. The method of claim 1, wherein the second range includes first and second portions, the second portion of the second range corresponding to higher current utilization than the first portion of the second range, wherein if the utilization scaling factor is in the first portion of the second range, the pattern includes at least one blocking entry and at least one unimpeded entry, and wherein if the utilization scaling factor is in the second portion of the second range, the pattern includes at least one blocking entry and at least one non-blocking entry.

6. The method of claim 5, wherein if the utilization scaling factor is in the first portion of the second range, the ratio of the number of unimpeded entries divided by the total number of entries in the pattern is proportional to the ratio of a desired utilization divided by the current utilization.

7. The method of claim 6, wherein if the utilization scaling factor is in the second portion of the second range, a value for the non-blocking entries is determined according to the utilization scaling factor.

8. The method of claim 7, wherein the second portion of the second range corresponds to utilization scaling factors for which the ratio of the desired utilization divided by the current utilization is less than or equal to K, K being greater than zero and less than or equal to 1.0, and wherein if the utilization scaling factor is in the second portion of the second range, a ratio of the number of non-blocking entries divided by the total number of entries in the pattern is proportional to K.

9. The method of claim 6, wherein the second portion of the second range corresponds to utilization scaling factors for which the ratio of the desired utilization divided by the current utilization is less than or equal to K, K being greater than zero and less than or equal to 1.0, and wherein if the utilization scaling factor is in the second portion of the second range, a ratio of the number of non-blocking entries divided by the total number of entries in the pattern is proportional to K.

10. The method of claim 5, wherein if the utilization scaling factor is in the second portion of the second range, a value for the non-blocking entries is determined according to the utilization scaling factor.

11. The method of claim 5, wherein the second portion of the second range corresponds to utilization scaling factors for which the ratio of the desired utilization divided by the current utilization is less than or equal to K, K being greater than zero and less than or equal to 1.0, and wherein if the utilization scaling factor is in the second portion of the second range, a ratio of the number of non-blocking entries divided by the total number of entries in the pattern is proportional to K.

12. The method of claim 11, wherein K is 0.5.

13. The method of claim 1, wherein the value of the utilization scaling factor decreases as the current utilization increases.

14. The method of claim 1, wherein the first range includes utilization scaling factors for which the current utilization is less than a desired utilization.

15. The method of claim 1, wherein determining the utilization scaling factor comprises dividing a desired utilization by the current utilization.

16. The method of claim 1, wherein determining the utilization scaling factor comprises dividing the current utilization by a desired utilization.

17. An apersistence control system for controlling utilization of a resource or pool of resources by a plurality of devices, the system comprising:
    means for determining a utilization scaling factor for a resource or pool of resources based at least in part on current utilization, where the value of the utilization scaling factor varies as the current utilization changes;
    means for creating an apersistence property pattern comprising a plurality of apersistence property entries corresponding to apersistence update cycles of an apersistence pattern window, wherein the plurality of apersistence property entries of the apersistence property pattern form a series of apersistence property entries corresponding to sequential apersistence update cycles of the apersistence pattern window, wherein if the utilization scaling factor is in a first range corresponding to low current utilization, the pattern includes unimpeded entries, and wherein if the utilization scaling factor is in a second range corresponding to higher current utilization, the pattern includes at least one blocking entry and at least one non-blocking or unimpeded entry; and
    means for providing an apersistence property pattern entry from the apersistence property pattern to the devices in each apersistence update cycle of the apersistence pattern window, wherein the apersistence property pattern entries are provided one at a time in sequence from the apersistence property pattern to the devices in each apersistence pattern window.

18. The system of claim 17, wherein the second range includes first and second portions, the second portion of the second range corresponding to higher current utilization than the first portion of the second range, wherein if the utilization scaling factor is in the first portion of the second range, the pattern includes at least one blocking entry and at least one unimpeded entry with a ratio of the number of unimpeded entries divided by the total number of entries in the pattern being substantially proportional to a ratio of a desired utilization divided by the current utilization, and wherein if the utilization scaling factor is in the second portion of the second range, the pattern includes at least one blocking entry and at least one non-blocking entry with a value of the non-blocking entries being determined according to the utilization scaling factor.

19. The system of claim 17, wherein devices of a plurality of different priority classes are able to utilize the resource, wherein the means for determining the utilization scaling factor determines a class utilization scaling factor for each priority class, wherein the means for creating an apersistence property pattern creates a class apersistence property pattern for each priority class according to the corresponding class utilization scaling factor, and wherein the means for providing an apersistence property pattern entry provides apersistence property pattern entries from the class apersistence property patterns to the devices in each apersistence update cycle of the apersistence pattern window.

20. The system of claim 17, wherein the apersistence control system is integrated in the resource.

21. The system of claim 17, wherein the second portion of the second range corresponds to utilization scaling factors for which the ratio of a desired utilization divided by the current utilization is less than or equal to K, K being greater than zero and less than or equal to 1.0, and wherein if the utilization scaling factor is in the second portion of the second range, a ratio of the number of non-blocking entries divided by the total number of entries in the pattern is proportional to K.

22. A wireless communications system base station resource, comprising:
 means for providing communications services to a plurality of mobile communications units; and
 an apersistence control system for controlling utilization of the base station by the mobile communications units, the apersistence control system being operatively coupled with the means for providing communications services and comprising:
  means for determining a utilization scaling factor for the base station resource based at least in part on current utilization, where the value of the utilization scaling factor varies as the current utilization changes;
  means for creating an apersistence property pattern comprising a plurality of apersistence property entries corresponding to apersistence update cycles of an apersistence pattern window, wherein the apersistence property pattern is created based at least partially on the determined utilization scaling factor, wherein the plurality of apersistence property entries of the apersistence property pattern form a series of apersistence property entries corresponding to sequential apersistence update cycles of the apersistence pattern window, wherein if the utilization scaling factor is in a first range corresponding to low current utilization, the pattern includes unimpeded entries, and wherein if the utilization scaling factor is in a second range corresponding to higher current utilization, the pattern includes at least one blocking entry and at least one non-blocking or unimpeded entry; and
  means for providing an apersistence property pattern entry from the apersistence property pattern to the mobile communications units in each apersistence update cycle of the apersistence pattern window, wherein the apersistence property pattern entries are provided one at a time in sequence from the apersistence property pattern to the devices in each apersistence pattern window.

23. The wireless communications system base station resource of claim 22, wherein the apersistence control system is integrated in the base station resource.

24. The wireless communications system base station resource of claim 22, wherein mobile communications units of a plurality of different priority classes are able to utilize the base station resource, wherein the means for determining the utilization scaling factor determines a class utilization scaling factor for each priority class, wherein the means for creating an apersistence property pattern creates a class apersistence property pattern for each priority class, and wherein the means for providing an apersistence property pattern entry provides apersistence property pattern entries from the class apersistence property patterns to the mobile communications units in each apersistence update cycle of the apersistence pattern window.

25. The wireless communications system base station resource of claim 22, wherein the second range includes first and second portions, the second portion of the second range corresponding to higher current utilization than the first portion of the second range, wherein if the utilization scaling factor is in the first portion of the second range, the pattern includes at least one blocking entry and at least one unimpeded entry with a ratio of the number of unimpeded entries divided by the total number of entries in the pattern being substantially proportional to a ratio of a desired utilization divided by the current utilization, and wherein if the utilization scaling factor is in the second portion of the second range, the pattern includes at least one blocking entry and at least one non-blocking entry with a value of the non-blocking entries being determined according to the utilization scaling factor.

26. The wireless communications system base station resource of claim 22, wherein the second portion of the second range corresponds to utilization scaling factors for which the ratio of a desired utilization divided by the current utilization is less than or equal to K, K being greater than zero and less than or equal to 1.0, and wherein if the utilization scaling factor is in the second portion of the second range, a ratio of the number of non-blocking entries divided by the total number of entries in the pattern is proportional to K.

27. A system for controlling utilization of a resource or pool of resources by a plurality of devices, the system comprising:
 a logic component operatively coupled with the resource, the logic component creating an apersistence property pattern comprising a plurality of apersistence property entries corresponding to apersistence update cycles of an apersistence pattern window, wherein the plurality of apersistence property entries of the apersistence property pattern form a series of apersistence property entries corresponding to sequential apersistence update cycles of the apersistence pattern window, wherein the logic component creates the pattern with unimpeded entries if current resource utilization is in a first range corresponding to low current utilization, and creates the pattern with at least one blocking entry and at least one non-blocking or unimpeded entry if the current resource utilization is in a second range corresponding to higher current utilization; and
 a hardware transfer component operatively coupled with the logic component and with the devices, the transfer component being operative to provide an apersistence property pattern entry from the apersistence property pattern to the devices in each apersistence update cycle of the apersistence pattern window, wherein the hardware transfer component provides the apersistence property pattern entries one at a time in sequence from the apersistence property pattern to the devices in each apersistence pattern window.

28. The method of claim 1, wherein the apersistence property pattern is created based at least partially on the determined utilization scaling factor.

29. The method of claim 1, wherein the plurality of apersistence property entries of the apersistence property pattern form a series of apersistence property entries corresponding to sequential apersistence update cycles of the apersistence pattern window.

30. The method of claim 29, wherein the apersistence property pattern entries are provided one at a time in sequence from the apersistence property pattern to the devices in each apersistence pattern window.

* * * * *